Sept. 11, 1923.                O. H. PERSHING                1,467,949
                           MEAT CLEAVER AND TENDERER
                              Filed Dec. 20, 1922
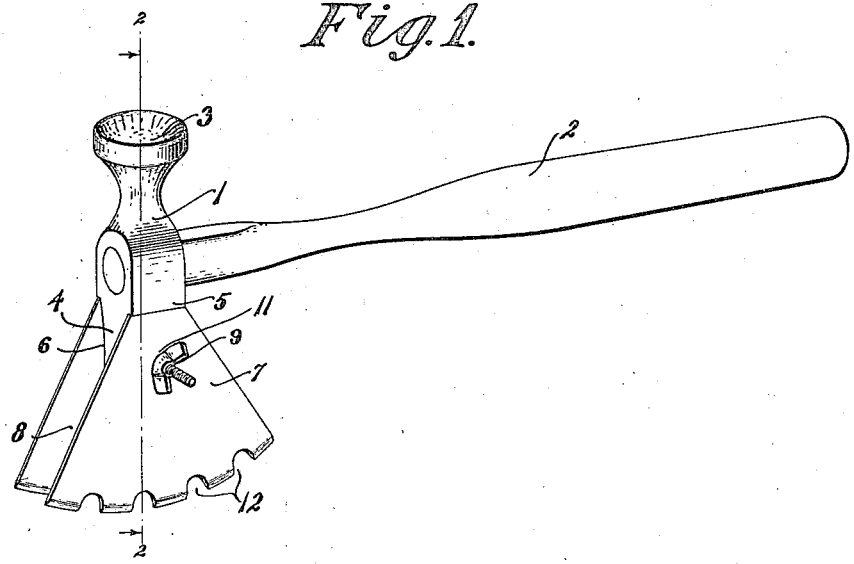
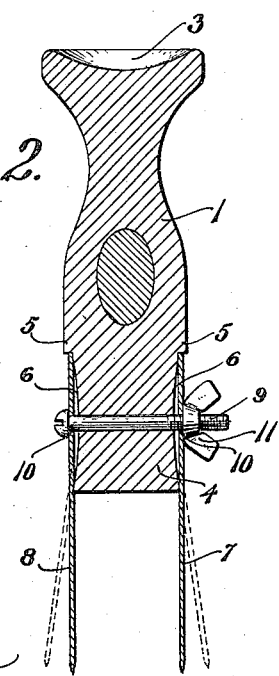
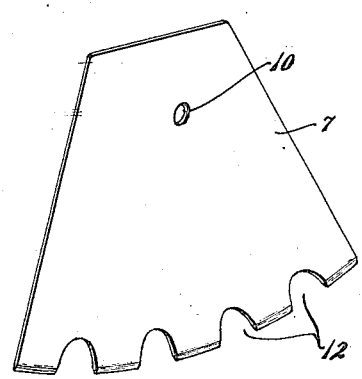
Olynthus H. Pershing.
INVENTOR Patented Sept. 11, 1923.

1,467,949

UNITED STATES PATENT OFFICE.

OLYNTHUS HOWARD PERSHING, OF MUNCIE, INDIANA.

MEAT CLEAVER AND TENDERER.

Application filed December 20, 1922. Serial No. 608,019.

*To all whom it may concern:*

Be it known that I, OLYNTHUS HOWARD PERSHING, a citizen of the United States, residing at Muncie, in the county of Delaware and State of Indiana, have invented new and useful Improvements in Meat Cleavers and Tenderers, of which the following is a specification.

My present invention has reference to a kitchen implement, and has for its primary object to produce a device of this character which may be employed as a meat cleaver and tenderer, and wherein the blades therefor are removable so that the said blades may be employed for a variety of purposes, such for instance as scaling fish, scraping utensils, etc.

A further object is to produce a kitchen implement that includes a handle member having a head attached to one end, the active or pounding face of which being concaved, and roughened if desired, said head having its opposite face formed with a lug whose sides are concaved and blades having their inner faces arranged against the said lugs in contact with the shoulders on the head inward of the lugs, while adjustable means secure the blades to the lug, the said means, when adjusted in one direction, flexing the blades to cause the cutting edges thereof to be adjusted with respect to each other.

To the attainment of the foregoing and other objects which will present themselves as the nature of the invention is better understood, reference is to be had to the drawings which accompany and which form part of this application.

In the drawings:—

Figure 1 is a perspective view of a kitchen implement in accordance with this invention.

Figure 2 is a sectional view on the line 2—2 of Figure 1, the dotted lines illustrating the arrangement of the cutting edges of the blades away from each other when securing means therefor is adjusted in one direction.

Figure 3 is a plan view of one of the blades employed.

As disclosed by the drawings I make use of a metal head 1 that has a socket therethrough for one end of a handle 2. The head has its active face concaved as at 3, and the inner wall thereof may, if desired, be roughened. By concaving the active end or face of the head meat pounded by the device will be forced to the center of the concavity while that portion of the said meat contacted by the edge of the said concaved portion will be crushed, with the result that the meat may be made tender in an easy and expeditious manner. The opposite face or end of the head 1 is formed with a reduced lug 4. For distinction the shoulders provided between the lug and head are indicated by the numerals 5. By reference to the drawings it will be noted that the outer sides or faces of the lug 4 are rounded inwardly from the opposed ends thereof. These concaved faces are indicated by the numerals 6 and serve to produce a result which is one of the important features of this invention.

The blades 7 and 8, employed are in the nature of flat metal members having an inherent resiliency and are of an equal thickness throughout. The blades are comparatively thin and if desired the cutting edges thereof may be sharpened. Each blade has an outer arcuate cutting edge, its sides inclined inwardly to its straight inner end or edge, which latter, are of a length approximately equaling that of the shoulders 5 on which the said edges of the blades rest.

The lug is centrally provided with a transverse round opening through which passes a bolt 9. The blades 7 and 8 are provided with similar openings 10 through which the bolt 9 passes. The projecting end of the bolt is engaged by a winged nut 11, which, of course, contacts with one of the blades. By reference to Figure 2 of the drawings it will be seen that when the nut 11 is screwed to one position on the bolt 9 the blades 7 and 8 are in contacting engagement with the inner and outer surfaces of the lug 4 and by reference to the dotted lines in the said Figure 2 it will be seen that when the nut is screwed further home the blades will be forced into contact with the entire concaved sides of the lug, with the result that the active or cutting edges of the blades are spread away from each other. Thus by variously adjusting the nut the cutting edges of the blades may be effectively sustained in spaced relation to each other. The blade 7 has its cutting edge notched as at 12 which is desirable in some instances, when meat is to be tendered by the blades. Any shock or jar to which the blades are subjected in tendering or chopping meat will be resisted by the contacted engagement of the inner ends of the blades on the shoulders on the head. By removing the blades the same may be employed for a variety of purposes other than that set forth, as for instance the said blades may be used for scaling fish, scraping pans, etc.

Having described the invention, I claim:—

1. In a device for the purpose set forth, a head, a handle therefor, said head having a concaved face and a reduced lug opposite the face, said lug having its outer faces concaved, segmental blades contacting said face of the lug and resting on the shoulders between the lug and head, and adjustable means securing the blades on the lug, as and for the purpose set forth.

2. In a device for the purpose set forth, a head, a handle therefor, cutting blades on the head, means sustaining the blades thereon, means on said sustaining means for influencing the latter and likewise contacting one of the blades for flexing both of the blades to adjust the cutting edges of the blades with respect to each other.

In testimony whereof I affix my signature.

OLYNTHUS HOWARD PERSHING.